ic Patent [19]

Vanderlaan et al.

[11] Patent Number: 4,641,812
[45] Date of Patent: Feb. 10, 1987

[54] DIRECT DRIVE VALVE AND FORCE MOTOR ASSEMBLY INCLUDING INTERCHANGEABLE STATOR ASSEMBLY AND ALIGNMENT SYSTEM OR METHOD

[75] Inventors: Robert D. Vanderlaan; Stanley D. Heeres, both of Kalamazoo, Mich.

[73] Assignee: Pneumo Corporation, Boston, Mass.

[21] Appl. No.: 737,251

[22] Filed: May 23, 1985

[51] Int. Cl.$^4$ .................. F16K 31/08; H01F 7/08; H02K 33/00
[52] U.S. Cl. .................. 251/65; 251/129.11; 251/129.2; 335/282; 310/36; 310/156; 29/157.1 R; 29/404
[58] Field of Search ............... 251/65, 129.11, 129.12, 251/129.2; 335/282; 310/36–39, 86, 156; 29/157.1, 404

[56] References Cited
U.S. PATENT DOCUMENTS 4,507,634 3/1985 Vanderlaan ..................... 335/272
4,510,403 4/1985 Vanderlaan et al. ............. 310/36

Primary Examiner—Arnold Rosenthal
Attorney, Agent, or Firm—Renner, Otto, Boisselle & Lyon

[57] ABSTRACT

A direct drive valve and force motor assembly including interchangeable stator assembly and method for accurately setting the magnetic spring null of the motor with respect to the servo valve hydraulic null independent of the actual motor stator assembly, whereby the motor stator assembly may be configured as an interchangeable plug-in module with interface electrical connector. This is accomplished by using a simple fixture which simulates the motor stator assembly and senses rotor magnet position. The stator simulating fixture may be used to rotatably adjust the position of the rotor casing so that the magnetic spring null corresponds to the hydraulic valve null. Both the stator simulating fixture and motor stator assembly include an index pin engageable with a stator alignment keyway in the rotor casing for maintaining the desired orientation therebetween. Also, rotor over-travel stops keyed to the rotor casing may be centered during the nulling process. Once the nulling process is complete, the stator simulating fixture may be removed and the motor stator assembly may be mounted in place. The motor stator assembly may be loosely held in an outer housing which has limited rotation relative to the motor stator assembly to permit a plug-in electrical connector for the stator windings on the exterior of the outer housing to be brought into alignment with a receptacle in the valve body and plugged into the receptacle without damaging the lead wires. Then the outer housing and motor stator assembly may be clamped in place as by threading a nut on a shaft extension on the outer end of the rotor casing which extends through an opening in an end wall of the outer housing.

20 Claims, 4 Drawing Figures

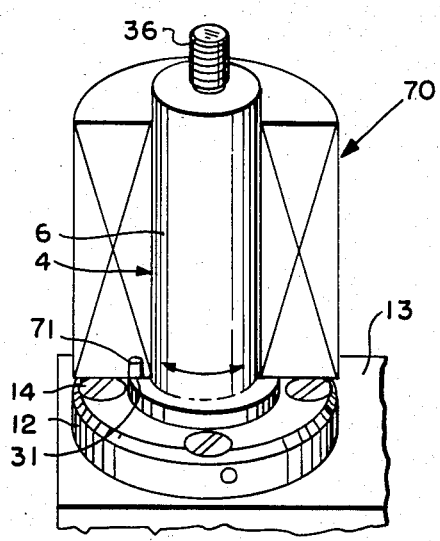
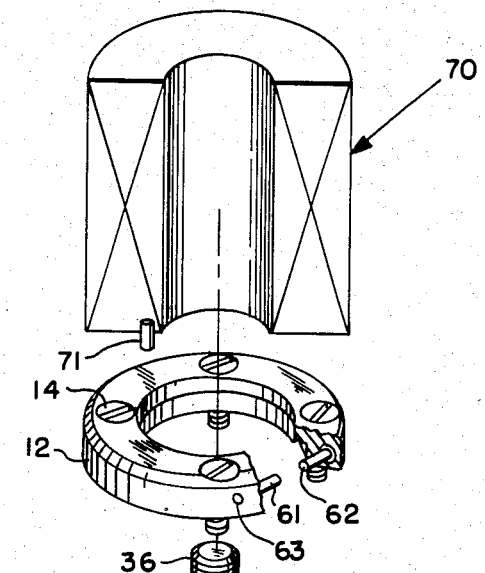
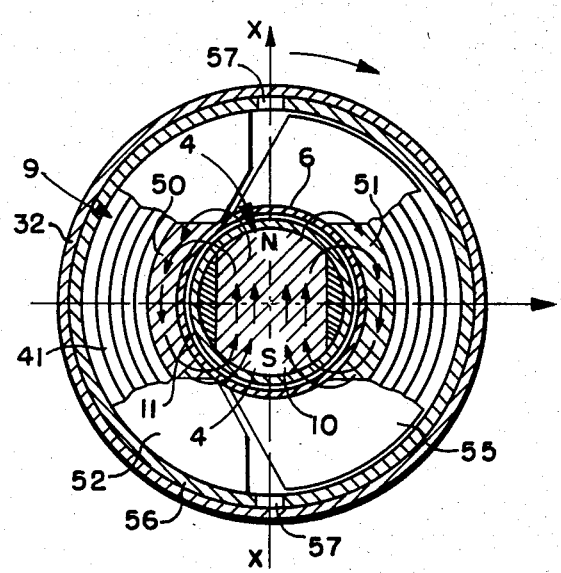
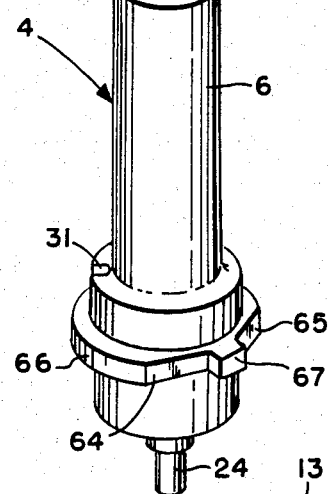
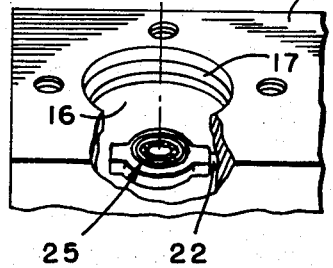

DIRECT DRIVE VALVE AND FORCE MOTOR ASSEMBLY INCLUDING INTERCHANGEABLE STATOR ASSEMBLY AND ALIGNMENT SYSTEM OR METHOD

BACKGROUND OF THE INVENTION

This invention relates generally as indicated to a direct drive valve and force motor assembly including an interchangeable motor stator assembly. In addition, such invention relates to a system or method for properly aligning the motor stator assembly to the rotor assembly so that the magnetic spring null of the motor corresponds to the hydraulic valve null whenever the motor stator assembly is replaced.

The force motor of the present invention is a limited angle torque motor which is particularly suited for use in certain types of high pressure fluid proportional servo control systems including but not limited to aircraft controls to drive a proportional control valve of relatively short stroke. The fluid pressure may for example be on the order of 1,000 psi or more.

In such a motor, it would be desirable to provide for the quick, repeatable in-line replacement of the motor stator assembly. Also, it would be desirable to provide a simple and effective system or method for accurately setting the magnetic spring null of the motor with respect to the servo valve hydraulic null independent of the actual motor stator assembly, so that the motor stator assembly may be configured as an interchangeable plug-in module with interface electrical connector.

SUMMARY OF THE INVENTION

In accordance with one aspect of the invention, a system or method is provided which facilitates the quick, repeatable, in-line replacement of the motor stator assembly in high torque.

Also in accordance with the invention, a positive, repeatable, in-line method is provided for properly aligning the motor stator assembly to the rotor assembly so that the magnetic spring null of the motor corresponds to the hydraulic valve null.

Further in accordance with the invention, a fixture which simulates the motor stator assembly and senses rotor magnetic position may be used to rotatably adjust the position of the rotor casing for properly aligning the stator assembly to the rotor assembly so that the magnetic spring null corresponds to the hydraulic valve null.

Still further in accordance with the invention, both the stator simulating fixture and motor stator assembly include an index pin engageable with a stator alignment keyway in the rotor casing for maintaining the desired orientation therebetween.

In accordance with a further aspect of the invention, rotor overtravel stops keyed to the rotor casing may also be centered during the nulling process.

Also in accordance with the invention, the motor stator assembly may be configured as a plug-in module with interface electrical connector for ease of removal and replacement.

Further in accordance with the invention, the motor stator assembly may be loosely held in an outer housing which has limited rotation relative to the motor stator assembly to permit a plug-in electrical connector for the stator windings on the exterior of the outer housing to be brought into alignment with a receptacle in the valve body without damaging the stator coil lead wires.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 2 is a reduced transverse section through the motor of FIG. 1 taken on the plane of the line 2—2 thereof;

FIG. 3 is an exploded isometric view showing the rotor assembly in alignment with an opening in the valve body; the retainer which is used to clamp the rotor casing to the valve body; and a stator simulating fixture which is used to rotatably adjust the angular position of the rotor casing and rotor assembly until the magnetic spring null of the motor corresponds to the hydraulic valve null of the valve assembly; and FIG. 4 is an isometric view showing the rotor assembly secured to the valve body by the retainer and the stator simulating fixture in position for adjusting the angular orientation of the rotor casing and rotor assembly to the desired position at which the magnetic spring null of the motor substantially corresponds to the hydraulic valve null of the valve assembly.

DETAILED DESCRIPTION OF THE PREFERRED EMBODIMENT

Figure 1:
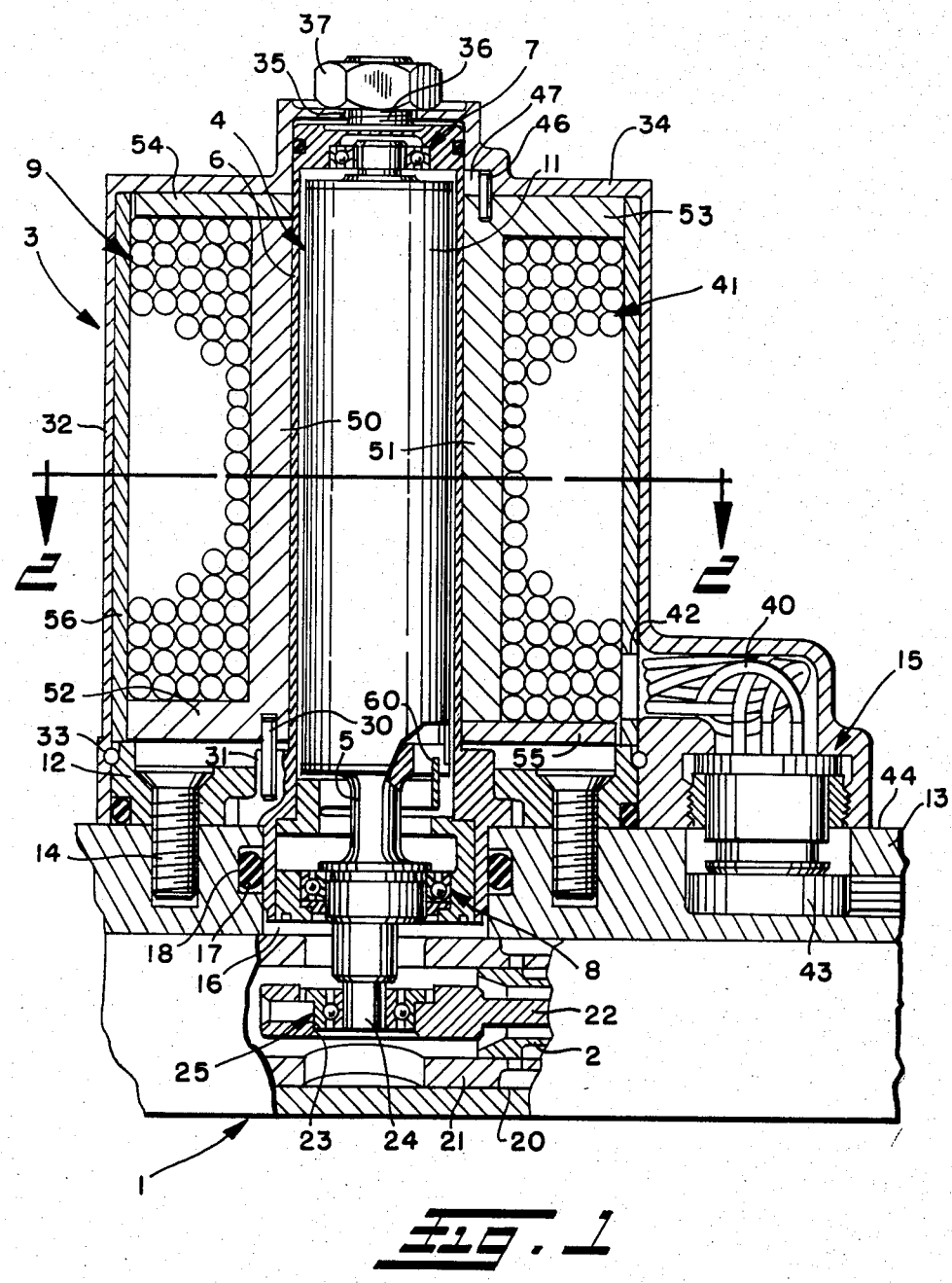
FIG. 1 is a fragmentary longitudinal section through a direct drive valve and force motor assembly including a preferred form of interchangeable stator assembly in accordance with the present invention.

Referring now in detail to the drawings, and initially to FIG. 1, there is shown one form of direct drive valve assembly 1 including a valve plunger 2 adapted to be directly driven by one form of force motor 3. The force motor 3 is primarily designed for use in high pressure fluid systems for directly driving a valve member such as the valve plunger 2 in proportional servo control systems including but not limited to aircraft controls. Preferably, such motor is a non-commutated two pole stationary coil rotary magnet motor including a rotor assembly 4 having a rotor shaft 5 journal mounted within a rotor casing 6 adjacent opposite ends thereof by rotor shaft bearings 7, 8 suitably supported by common casing structure. A motor stator assembly 9 surrounds the rotor assembly 4 and rotor casing 6 as shown.

The rotor shaft 5 may be of a one-piece construction, with a transverse slot machined therein for receipt of one or more permanent magnets 10 intermediate the ends thereof. The magnets are magnetized in the diametrical direction, that is, the north and south poles of the magnet are diametrically oriented as shown in FIG. 2. Also, such magnets may be rare earth magnets and are desirably contained within a protective cover or sleeve 11 which may be slipped over the rotor shaft and magnet assembly after the assembly has been ground into a solid cylindrical shape to prevent potential rotor magnet breakage contamination. The magnets and cover may be held in place by a suitable adhesive.

A suitable retainer 12 may be used to clamp the rotor casing 6 to the valve housing 13 as by means of a plurality of mounting bolts 14. The motor stator assembly 9, on the other hand, is desirably configured as a plug-in module with interface electrical connector 15 as described hereafter. As clearly shown in FIG. 1, the rotor casing 6 extends into a cavity 16 in the valve housing 13 through a static, diametrical packing 17 mounted in a groove 18 to provide a static seal around the rotor casing to keep the stator assembly 9 dry, thus allowing for the removal and replacement of the stator assembly without disturbing the rotor assembly and rotor casing surrounding same.

When the motor is installed as shown in FIG. 1, the motor output shaft 5 extends perpendicularly into a longitudinal bore 20 in the valve housing 13. Within the bore 20 is a valve sleeve 21 which receives the axially movable valve plunger 2. The motor output shaft may be drivingly connected to the valve plunger by means of a suitable drive linkage mechanism which may, for example, consist of a flexible drive shaft 22 connected at its opposite ends to the valve plunger 2 and motor output shaft 5, respectively. The flexible drive shaft 22 desirably extends axially outwardly beyond the valve plunger and has a transverse bore 23 in such outer end for receipt of an eccentric 24 on the outer end of the motor output shaft. The eccentric rotates about a 90° centerline relationship between the motor 3 and valve 2 to convert rotary motion to linear motion. The flexible drive shaft 22 between the motor eccentric 24 and the valve plunger 2 accommodates such eccentric drive movements without inducing unacceptable plunger side loads and associated friction. An anti-friction bearing 25 connection may be provided between the eccentric 24 and flexible drive shaft 22 to provide a low friction pivot point therebetween resulting in a highly efficient linkage under adverse chip shear loading requirements and the like.

The motor stator assembly 9 mounts over the rotor casing 6 and has an index pin 30 at the axial inner end thereof which is adapted to be received in a stator alignment keyway 31 in the rotor casing as further shown in FIG. 1 to radially locate the stator assembly with respect to the rotor casing. The stator assembly may in turn be loosely held within an outer housing 32 as by means of a C-shaped retaining ring 33 at the open end of the housing through which the stator assembly is inserted. The axial outer end of the outer housing has an end wall 34, with a relatively small central opening 35 therethrough for receipt of a shaft extension 36 on the closed axial outer end of the rotor casing 6. The shaft extension may be threaded as shown for threaded engagement by a nut 37 for releasably clamping the outer housing and thus the stator assembly contained therein to the rotor casing.

On the exterior of the outer housing 32 is the plug-in electrical connector 15 which receives the lead wires 40 for the stator windings 41. Such lead wires may extend through an opening 42 in the outer housing in line with the plug-in electrical connector to facilitate plugging of the stator assembly into a receptacle 43 in the motor mounting face 44 of the valve housing 13.

A rotation limiting pin 46 is desirably provided on the axial outer end of the stator assembly 9 for receipt in an arcuate slot 47 in the closed end 34 of the outer housing 32 to permit limited rotation of the outer housing relative to the stator assembly, for example, approximately ±5°, so that the plug-in electrical connector 15 on the outer housing can be rotated into proper alignment with the receptacle 43 in the valve housing 13 and plugged into the receptacle without damaging the lead wires 40 during handling and assembly. The stator assembly and outer housing are then clamped in place by tightening the nut 37 on the shaft extension 36 in the manner previously described.

Preferably the stator assembly 9 includes a pair of axially extending circumferentially spaced stator magnetic poles 50, 51 about which the stator windings 41 circumferentially extend with the axis of the stator windings being generally parallel to the rotor axis. At opposite ends of the respective stator magnetic poles there is provided a magnetic pole flange or end portion 52, 53 which extends radially outwardly therefrom. A stator magnetic pole flange 52, 53 is provided at one end only of each of the stator magnetic poles. To complete the stator assembly, end plates 54, 55 made of a substantially non-magnetic material such as non-magnetic aluminum may be provided at the end of each stator pole 50, 51 opposite the respective stator pole flanges 52, 53.

A magnetic housing 56 made of a suitable magnetic material such as soft iron surrounds the stator coil 41 to provide a magnetic return path for the magnetic field when the stator coil is excited. Such magnetic return path is desirably partially interrupted by providing one or more air gaps 57 in the outer magnetic housing 56 as shown in FIG. 2. The magnetic flux produced by the permanent rotor magnets 10 develops a magnetic reluctance torque that tends to center the rotor north and south poles, N, S about an axis extending substantially centrally between the opposed opposite sides of the stator poles 50, 51 as depicted in FIG. 2. As the rotor shaft 5 is rotated by an external force, the magnetic reluctance torque develops a restoring torque which varies in magnitude with rotation and acts in opposition to any applied external force tending to return the rotor north and south poles to the original centered or null magnetic position.

In addition to the magnetic reluctance torque developed by the rotor magnets 10, an electro-magnetic or magnetic fields torque is developed when the electromagnetic stator coil 41 is excited. The magnetic fields torque is proportional to the amount of direct or pulse width modulated current passing through the stator coil. When a positive current is applied, a positive torque tending to rotate the rotor shaft 5 in one direction away from the magnetic null position is produced over a relatively large excursion of the rotor shaft. Conversely, when a negative current is applied, a negative torque tending to rotate the rotor shaft in the opposite direction away from the magnetic null position is produced over the same excursion of the rotor shaft. Rotor over-travel stops 60 (FIG. 1) may be keyed to the rotor casing 6 to dampen the end movement of the rotor shaft 5 and thus the external load driven thereby (such as the valve plunger 2) during energization of the motor to absorb the full stroke rotor inertia without part damage or deformation. Upon deenergization of the motor, the magnetic reluctance torque produced by the magnet fluxes will once again return the rotor assembly to its null or centered position.

The orientation of the rotor casing 6 relative to the retainer 12 and thus the valve housing 13 to which the rotor casing is secured by the retainer may be established by providing a pair of opposed set screws 61, 62 located in a threaded cross bore 63 in the retainer. The ends of the set screws may extend into a pair of milled slots 64, 65 in an external shoulder 66 on the rotor casing 6 for engagement with the opposite sides of a stop shoulder 67 which may be a portion of the external shoulder 66 left intact during milling of the slots. See FIG. 3.

By configuring the motor stator assembly 9 as a plug-in module with interface electrical connector 15 and removable retaining nut 37, and providing an index pin 30 on the motor stator assembly which engages a stator alignment key 31 on the rotor casing 6 as previously described, a quick, repeatable, in-line method for replacement of the stator assembly 9 and outer housing 32 surrounding same will be provided once the magnetic flux (spring) null of the motor is properly adjusted to correspond with the servo valve hydraulic null position. Preferably, this is accomplished in accordance with the present invention prior to mounting the motor stator assembly over the rotor casing with the use of a simple fixture 70 (FIGS. 3 and 4) which simulates the motor stator assembly but does not have an outer housing surounding same to obscure the adjustment screws 61, 62 in the retainer 12 or lead wires or electrical connector projecting therefrom to interfere with such adjustment.

To adjust the magnetic spring null of the rotor to correspond to the hydraulic valve null, first the rotor casing 6 with the rotor assembly 4 rotatably journaled therein is inserted into the opening 16 in the valve housing 13 through the static seal 17 to connect the eccentric 24 on the motor output shaft to the flexible drive shaft 22 for driving the valve plunger 2. Next the retainer 12, which provides rotational adjustment, locking, and hold-down capabilities for the rotor casing, is inserted over the rotor casing and installed onto the valve housing by means of the fasteners 14 as shown in FIG. 4. Then the stator simulating fixture 70, which is made of a suitable magnetic material having the same magnetic flux path as the actual motor stator assembly 9 and an index pin 71 mounted in the same relative position as the index pin 30 on the actual motor stator assembly, is positioned over the rotor casing 6 with the fixture index pin 71 engaging the stator alignment keyway 31 in the rotor casing as further shown in FIG. 4.

Because the stator simulating fixture 70 provides the same magnetic flux path as the actual motor stator assembly, the stator simulating fixture will cause the rotor magnets 10 to center themselves with respect to the fixture. Accordingly, the fixture may be rotated to rotationally adjust the angular position of the rotor casing and rotor magnets until the magnetic spring null of the rotor assembly corresponds to the hydraulic valve null. Before making such rotational adjustment, one or the other of the set screws 61, 62 should be backed off sufficiently from the stop shoulder 67 on the rotor casing so as not to interfere with such rotational movement. To accurately set the final magnetic spring null position to correspond to the hydraulic valve null will require the use of a hydraulic test bench. Once this adjustment has been made, the rotor casing 6 may be locked in position by proper tightening of the set screws 61, 62. The rotor over-travel stops 60 (FIG. 1), being keyed to the rotor casing 6, will also be centered during this nulling process. If desired, significant valve null position bias may also be established by turning the set screws 61, 62 in opposite directions to cause limited angular adjustment of the rotor assembly off null. In this way, significant valve null position bias may be set without inducing friction that would otherwise result if the spring force were applied directly to the valve 2 or other external load.

Once the nulling process is complete, the stator simulating fixture 70 may be removed from the properly positioned rotor casing and rotor assembly. Thereafter the motor stator assembly 9 may be treated as a plug-in module, the index pin 30 on the motor stator assembly providing proper radial location of the motor stator assembly with respect to the rotor casing and rotor assembly. Also, the slot-pin connection 47, 46 between the outer housing 32 and stator assembly 9 will permit limited rotation of the outer housing with respect to the motor stator assembly to allow the plug-in electrical connector 15 to be brought into proper alignment with the receptacle 43 in the valve housing 13 and plugged into the receptacle without damaging the lead wires 40. Then the outer housing and motor stator assembly may be clamped in place by threading the nut 37 on the casing extension 36 as previously described.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A limited angle torque motor comprising a rotor casing, a rotor assembly mounted for rotation within said rotor casing, means for clamping said rotor casing to a support surface while permitting limited rotational adjustment of said rotor casing relative to said support surface, and an interchangeable motor stator assembly adapted to be slidably received over one end of said rotor casing and clamped thereto, said motor stator assembly and rotor casing including a pin-slot connection therebetween for aligning said motor stator assembly to said rotor casing, an outer housing surrounding said motor stator assembly, electrical connector means for said stator assembly on the exterior of said outer housing, means for providing limited rotation of said outer housing relative to said motor stator assembly to permit said electrical connector means to be rotated into alignment with a receptacle in such support surface for plugging into said receptacle, and means for removably clamping said outer housing and motor stator assembly to said rotor assembly.

2. The motor of claim 1 wherein said means for providing limited rotation of said outer housing relative to said motor stator assembly comprises a pin on the axial outer end of said motor stator assembly which is received in an arcuate slot in an end wall of said outer housing.

3. The motor of claim 2 wherein said arcuate slot allows for approximately ±5° of rotation of said outer housing relative to said motor stator assembly.

4. The motor of claim 1 wherein said means for removably clamping said outer housing and motor stator assembly to said rotor casing comprises a shaft extension on one end of said rotor casing which extends through an opening in an end wall of said outer housing, and a nut threaded onto the outer end of said shaft extension.

5. The motor of claim 1 wherein said pin-slot connection comprises an index pin on said motor stator assembly which is adapted to be received in a stator alignment keyway in said rotor casing.

6. In combination, a linear valve member and a rotary force motor, said linear valve member including a valve housing containing an axial bore, and a valve plunger axially movable in said bore in opposite directions from a hydraulic null position, and said rotary force motor including a rotor casing, a rotor assembly mounted for rotation within said rotor casing, means for clamping said rotor casing to said valve housing while permitting limited rotational adjustment of said rotor casing relative to said valve housing, means for drivingly connecting said rotor assembly to said valve plunger whereby actuation of said motor will cause axial movement of said valve plunger from such hydraulic null position, a motor stator assembly adapted to be removably inserted over the outer end of said rotor casing, said motor stator assembly having an index pin, and said rotor casing having a stator alignment keyway therein for receipt of said index pin to orient said motor stator assembly relative to said rotor casing, said motor including a magnetic centering spring for maintaining said rotor assembly in a magnetic spring null position when said motor is deenergized, and means for rotating said rotor assembly out of said magnetic spring null position when said motor is energized to cause a corresponding linear movement of said valve plunger, means for removably clamping said motor stator assembly to said rotor casing, and means for rotatably adjusting the angular position of said rotor casing relative to said valve housing until the magnetic spring null of said rotor assembly corresponds to said hydraulic valve null prior to insertion of said motor stator assembly over said rotor casing.

7. The combination of claim 6 wherein said last-mentioned means comprises a stator simulating fixture having the same magnetic flux path as said motor stator assembly and an index pin mounted in the same relative position as said index pin on said motor stator assembly, said stator simulating fixture being adapted to be positioned over said rotor casing with said fixture index pin engaging said stator alignment keyway in said rotor casing and rotated to adjust the angular position of said rotor casing relative to said valve housing.

8. The combination of claim 7 further comprising means for clamping said rotor casing against further rotational adjustment after the angular position of said rotor casing has been set by rotation of said stator simulating fixture.

9. The combination of claim 7 further comprising rotor over-travel stops keyed to said rotor casing which are centered during such rotational adjustment of said rotor casing.

10. The combination of claim 6 further comprising an outer housing surrounding said motor stator assembly, a plug-in electrical connector for said motor stator assembly on the exterior of said outer housing, means for providing limited rotation of said outer housing relative to said motor stator assembly to permit said electrical connector to be rotated into alignment with a receptacle in said valve housing for plugging said electrical connector into said receptacle, and means for clamping said outer housing to said rotor casing after said electrical connector has been plugged into said receptacle.

11. The combination of claim 10 wherein said means for providing limited rotation of said outer housing relative to said motor stator assembly comprises a pin on the axial outer end of said motor stator assembly which is received in an arcuate slot in an end wall of said outer housing.

12. The combination of claim 11 wherein said arcuate slot permits approximately ±5° of rotation of said outer housing relative to said motor stator assembly.

13. The combination of claim 10 wherein said means for removably clamping said outer housing to said rotor casing comprises a shaft extension on the outer end of said rotor casing which extends through an opening in an end wall of said outer housing, and a nut threaded onto the outer end of said shaft extension.

14. A method of aligning the magnetic spring null of a limited angle torque motor with the hydraulic null of a linear valve member to be driven thereby comprising the steps of inserting a rotor casing and rotor assembly rotatably mounted therein into an opening in a valve housing to drivingly connect a motor output shaft to a linear valve member, clamping the rotor casing to the valve housing by means of a retainer which permits limited rotational adjustment of the rotor casing relative to the valve housing, inserting a stator simulating fixture over the rotor casing to engage an index pin on the fixture in a stator alignment keyway on the rotor casing, such fixture having the same magnetic flux path as the actual motor stator assembly and the fixture index pin being located in the same relative position as an index pin on such motor stator assembly, and rotating the fixture to rotatably adjust the angular position of the rotor casing and rotor assembly until the magnetic spring null of the motor corresponds to the hydraulic null of the valve member.

15. The method of claim 14 wherein the rotor casing has rotor over-travel stops keyed thereto which are centered during such rotational adjustment of the rotor casing.

16. The method of claim 14 further comprising the step of securing the rotor casing against further rotational adjustment after such rotational adjustment of the rotor casing has been completed.

17. The method of claim 14 further comprising the steps of removing the stator simulating fixture from the rotor casing after such rotational adjustment of the rotor casing has been completed, and mounting the motor stator assembly over the rotor casing with the index pin on the motor stator assembly engaging the stator alignment keyway in the rotor casing to provide proper radial location of the stator assembly with respect to the rotor casing and rotor assembly.

18. The method of claim 17 further comprising the steps of rotating an outer housing surrounding the motor stator assembly relative to the motor stator assembly to align an electrical connector on the exterior of the outer housing with a receptacle in the valve housing, and plugging the electrical connector into the receptacle.

19. The method of claim 18 further comprising the step of removably clamping the outer housing and motor stator assembly to the rotor casing after the electrical connector has been plugged into the receptacle in the valve housing.

20. In combination, a linear valve member and a rotary force motor, said linear valve member including a valve housing containing an axial bore, and a valve plunger axially movable in said bore in opposite directions from a hydraulic null position, and said rotary force motor including a rotor casing, a rotor assembly mounted for rotation within said rotor casing, means for clamping said rotor casing to said valve housing while permitting limited rotational adjustment of said rotor casing relative to said valve housing, means for drivingly connecting said rotor assembly to said valve assembly whereby actuation of said motor will cause axial movement of said valve plunger from such hydraulic null position, and an interchangeable motor stator assembly adapted to be slidably received over the outer end of said rotor casing and clamped thereto, said motor stator assembly and rotor casing including a pin-slot connection therebetween for aligning said motor stator assembly to said rotor casing, an outer housing surrounding said motor stator assembly, electrical connector means for said motor stator assembly on the exterior of said outer housing, means for providing limited rotation of said outer housing relative to said motor stator assembly to permit said electrical connector means to be rotated into alignment with a receptacle in said valve housing for plugging into said receptacle, and means for removably clamping said outer housing and motor stator assembly to said rotor assembly.

* * * * *